US011113097B2

(12) United States Patent
Gujarathi et al.

(10) Patent No.: US 11,113,097 B2
(45) Date of Patent: Sep. 7, 2021

(54) SYSTEM AND METHOD FOR PROVISIONING INTEGRATION INFRASTRUCTURE AT RUNTIME INDIFFERENT TO HYBRID NATURE OF ENDPOINT APPLICATIONS

(71) Applicant: BOOMI, INC., Round Rock, TX (US)

(72) Inventors: Manoj S. Gujarathi, Austin, TX (US); Jeffrey Plater, Havertown, PA (US); James T. Ahlborn, West Chester, PA (US)

(73) Assignee: BOOMI, INC., Round Rock, TX (US)

( * ) Notice: Subject to any disclaimer, the term of this patent is extended or adjusted under 35 U.S.C. 154(b) by 444 days.

(21) Appl. No.: 15/841,027

(22) Filed: Dec. 13, 2017

(65) Prior Publication Data

US 2019/0179664 A1  Jun. 13, 2019

(51) Int. Cl.
*G06F 9/48* (2006.01)
*G06F 9/50* (2006.01)
(Continued)

(52) U.S. Cl.
CPC .............. *G06F 9/4806* (2013.01); *G06F 8/34* (2013.01); *G06F 9/455* (2013.01); *G06F 9/5077* (2013.01);
(Continued)

(58) Field of Classification Search
CPC ... G06F 8/60; G06F 9/44; G06F 9/445; G06F 9/44505; G06F 9/455; G06F 9/44504;
(Continued)

(56) References Cited

U.S. PATENT DOCUMENTS 8,533,661 B2  9/2013  Nucci
8,997,107 B2  3/2015  Jain
(Continued)

OTHER PUBLICATIONS

MuleSoft, Inc., MuleSoft CloudHub Platform Services Website, Aug. 2017, 5 pages, https://ww.mulesoft.com/platform/saas/cloudhub-ipaas-cloud-based-integration.
(Continued)

*Primary Examiner* — Vivek Srivastava
*Assistant Examiner* — William C McBeth
(74) *Attorney, Agent, or Firm* — Prol Intellectual Property Law, PLLC; H. Kenneth Prol

(57) ABSTRACT

An information handling system operating a hybrid endpoint integration process liaison system may comprise a memory for storing a customized software integration application for a specific integration process comprising a plurality of code sets to enable to enable access and manipulation of electronic data at a customer-specified electronic data storage location, each of the code sets being associated with a visual modeling element in a customized visual model of the specific integration process, and a processor executing code instructions of the hybrid endpoint integration process liaison system to determine an optimal configuration for execution of the plurality of code sets by one or more run-time engines based the electronic data storage location, wherein the optimal configuration includes one or more execution locations on the one or more run-time engines and associates the one or more runtime engines with the plurality of code sets, and transmit one or more code sets of the plurality of code sets for execution at the one or more execution locations according to the optimal configuration.

20 Claims, 7 Drawing Sheets

(51) Int. Cl.
  *H04L 29/06* (2006.01)
  *H04L 29/08* (2006.01)
  *G06F 9/455* (2018.01)
  *G06F 8/34* (2018.01)
(52) U.S. Cl.
  CPC .......... *H04L 63/00* (2013.01); *H04L 63/0227* (2013.01); *H04L 63/0272* (2013.01); *H04L 67/34* (2013.01); *H04L 67/104* (2013.01); *H04L 67/1097* (2013.01)
(58) Field of Classification Search
  CPC .... G06F 9/44508; G06F 9/45516; G06F 9/48; G06F 9/4806; G06F 9/4843; G06F 9/50; G06F 9/5005; G06F 9/5027; G06F 9/5033; G06F 9/5066; H04L 29/08135; H04L 67/10; H04L 67/1097; H04L 67/34
  See application file for complete search history.

(56) References Cited

U.S. PATENT DOCUMENTS

| | | | |
|---|---|---|---|
| 9,225,724 B2 | 12/2015 | Das | |
| 9,529,773 B2 | 12/2016 | Hussain | |
| 9,740,436 B2 | 8/2017 | Fiebrich-Kandler | |
| 10,594,620 B1* | 3/2020 | Greenwood | H04L 67/10 |
| 2008/0270977 A1* | 10/2008 | Nucci | G06F 8/10 717/105 |
| 2012/0136697 A1* | 5/2012 | Peles | H04L 67/02 705/7.38 |
| 2015/0160884 A1 | 6/2015 | Scales | |
| 2015/0180729 A1* | 6/2015 | Said | H04L 67/34 709/220 |
| 2015/0339107 A1* | 11/2015 | Krishnamurthy | G06F 8/34 717/107 |
| 2015/0381425 A1* | 12/2015 | Kansal | G06F 9/505 709/224 |
| 2016/0057073 A1* | 2/2016 | Steinder | G06F 8/61 709/226 |
| 2017/0078366 A1* | 3/2017 | Jung | H04L 67/10 |
| 2017/0147297 A1* | 5/2017 | Krishnamurthy | G06F 8/20 |

OTHER PUBLICATIONS

MuleSoft, Inc., MuleSoft Deploying to CloudHub // MuleSoft Documentation Website, Aug. 2017, 15 pages, https://docs.mulesoft.com/runtime-manager/deploying-to-cloudhub.

* cited by examiner

SYSTEM AND METHOD FOR PROVISIONING INTEGRATION INFRASTRUCTURE AT RUNTIME INDIFFERENT TO HYBRID NATURE OF ENDPOINT APPLICATIONS

FIELD OF THE DISCLOSURE

The present disclosure relates generally to a system and method for storing data accessed and manipulated between an on-site data center and a private cloud storage module pursuant to an integration process modeled with a customer-designed visual flow diagram.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components, telecommunication, network communication, and video communication capabilities and require communication among a variety of data formats. Further, the information handling system may include cloud-based storage modules.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
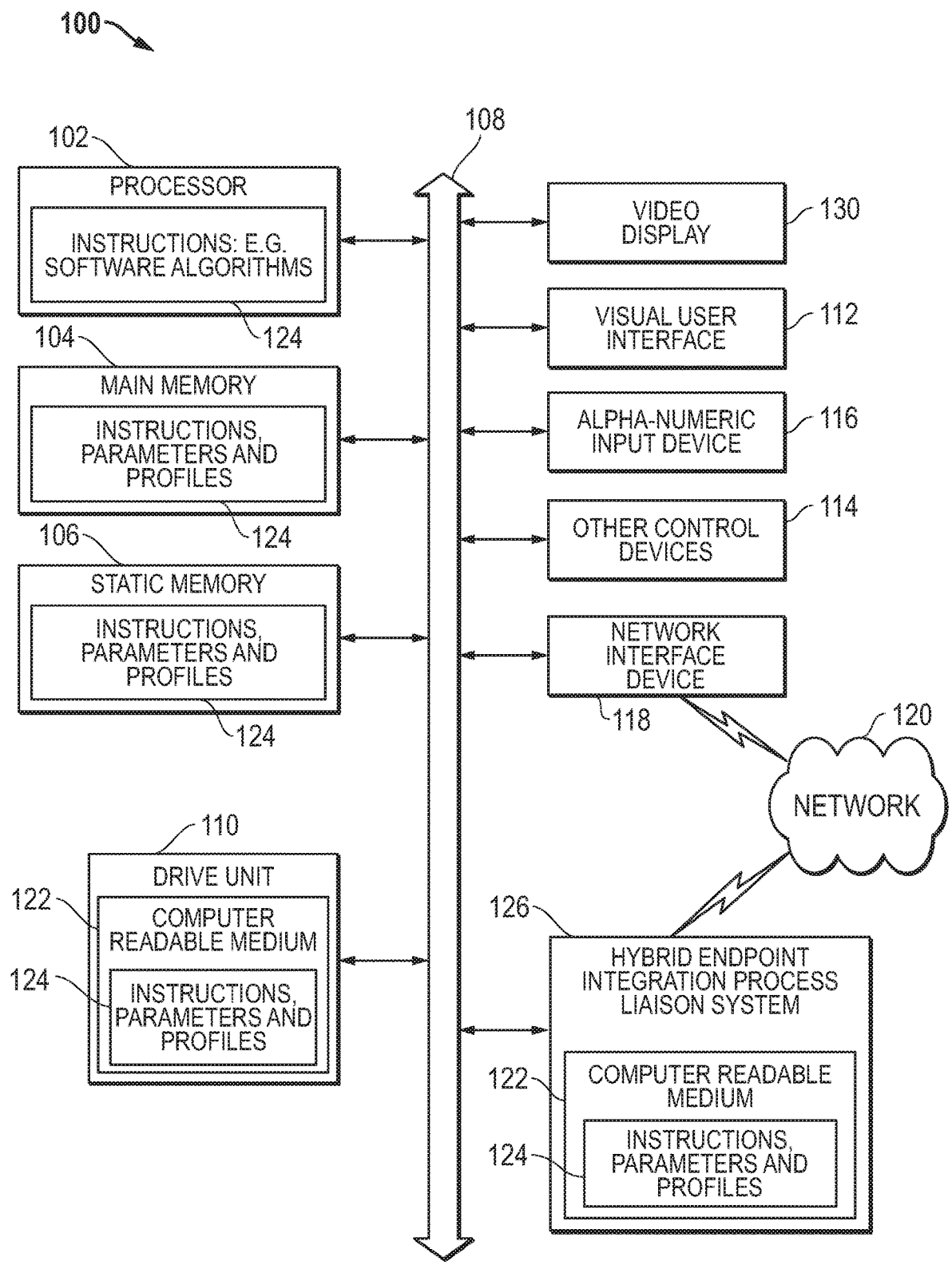
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, such as a CD-ROM, or distribution via download of the application from the worldwide web to an end user. Upon receipt of the computer-readable medium or downloaded application, the end user executes installation files stored in a memory to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are readily available in the market today. These applications are typically purchased from software vendors and installed on a computerized system owned and maintained by the business, in this example the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc. physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart®, and how that data should be communicated with Walmart®. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model an "integration process" via a flowcharting process, using only a web browser interface. During such a modeling process, the user would select from a predetermined set of process-representing visual elements that are stored on a remote server, such as the web server. By way of an example, the integration process could enable a bi-directional exchange of data between its internal applications, between its internal applications and its external trading partners, or between internal application and applications running external to the enterprise. Applications running external to the enterprise are commonly referred to as SaaS "Software as a Service."

A customized data integration software application creation system may allow a user to create a customized data integration software application by modeling a data integration process flow using a visual user interface. A user may model the process flow by adding visual elements representing integration process components which are associated with code sets incorporating machine-readable, executable code instructions for execution by a runtime engine. Each process component may be associated with an integration process action to be taken on incoming data. Each process component may further be associated with process component parameters detailing specific aspects of the process action to be taken. For example, a process component may instruct the runtime engine to take the action of querying a database, and the process component parameters may provide the name, location, user name, and required password for achieving the action of querying the database. Each process component parameter in an embodiment may be associated with a data profile code set.

If a process component having process component parameters specific to one of a user's known trading partners, the user may wish to reuse the same process component (which has already been tailored for use with a specific known trading partner) in other data integration process flows. In such a scenario, a user may save the process component already tailored for use with a specific known trading partner as a trading partner component, which the customized data integration software application creation system may associate with a trading partner code set.

A customized data integration software in an embodiment may include a runtime engine for execution of one or more code sets, a connector code set comprising data required for electronic communication in accordance with a specific application programming interface (API), a trading partner code set comprising data required for electronic communication with a specific trading partner's system, and/or a data profile code set associated with a user-specified process component parameter. One or more code sets may be transmitted to the location of a dynamic runtime engine associated with such code sets, and the dynamic runtime engine, when initiated, in an embodiment, may execute those code instructions to perform all or parts of the integration process modeled by the visual flowchart generated by the user.

As changes are made to this model, via the website, or to the code that executes the model, the executable software application may automatically check for, receive, and apply these changes as needed without requiring human intervention. Each visually modeled integration process may represent a complete end-to-end interface. For example, a process could be modeled to accept a purchase order (PO) from a retailer such as Walmart®, transform the PO into a format recognizable by a certain internal order management software application of the enterprise, and then insert the contents of that PO directly into the enterprise's order management system.

Currently, many business owners store a portion of proprietary electronic data records and applications in the public cloud while simultaneously storing the remaining portion of proprietary electronic data records either on-site at the customer's location, behind a secure firewall (e.g. within an enterprise system), or in a private cloud storage repository providing similar security measures. As a consequence, code sets executed by a runtime engine pursuant to an integration process may involve accessing and manipulation of data located at an on-site customer controlled data centers, customer controlled cloud server, and/or cloud server not under customer control. In addition, the data to be accessed and manipulated may be located behind a firewall, such as for example, in a firewalled on-site customer data center, or in a private cloud operated by the customer or another party.

Determination of endpoints within a customized integration process developed via the customized data integration software and the nature of data types, data locations, and infrastructure at those locations of the endpoints for the customized integration process was previously a manual procedure. In aspects of the present disclosure, a hybrid endpoint integration process liaison system is disclosed which may automatically parse a customized integration including the code sets associated with integration elements for locations of where electronic data must be accessed from or manipulated. Such parsing may be used to assess security barriers and other infrastructure such as firewalls that may be located at the one or more locations. The hybrid endpoint integration process liaison system may then assess whether to operate the customized data integration software code sets entirely at runtime engine locations outside of the security barriers and access data using VPN tunnels or the like, within the security barriers such as the firewall, or in a hybrid fashion with portions operating at plural runtime engines at either side of any security barriers.

The dynamic runtime engine in embodiments of the present disclosure may be executed at any of these locations. For example, a single runtime engine may execute the code sets associated with an entire integration process within a cloud server. Execution of code sets in the cloud may offload the computing overhead associated with execution of the integration process from the on-site customer's data center, and redistribute it to a cloud location. In such a way, the customer may free up more local computing resources for other tasks that are required to occur on-site.

In other aspects of embodiments of the present disclosure, a portion of the code sets associated with an integration process may be executed at a first location by a first runtime engine, and a second portion of the code sets of the same integration process may be executed at a second location by a second runtime engine. For example, such a hybrid plural-engine configuration may involve execution of some of the code sets at a customer's on-site data center, behind a firewall, by a first runtime engine, and execution of some of the code sets outside the firewall and within the cloud by a second runtime engine. Accessing data located behind a firewall from outside the firewall, as would occur with a single runtime engine executed outside a firewall, may involve executing all access attempts via a VPN tunnel through the firewall. Communication via VPN may slow down each attempted access. In such scenarios, it may be more efficient to execute a portion of the code sets within an integration process from behind the firewall, to avoid time constraints associated with VPN access. A system is needed to determine the most optimal execution configuration for each code set in an integration process.

Current solutions involve the customer determining whether to use one or more runtime engines, and determining the location of the execution of each runtime engine. Customers may need to employ IT experts in order to effectively identify the most efficient execution configuration. A solution is needed to automatically determine the optimal execution configuration for each of the code sets of the integration process based on details of the specific integration process modeled by each individual customized visual flow chart.

Embodiments of the present disclosure address this issue by identifying optimal locations for execution of each code set associated with each integration process based on an evaluation of the visual elements employed in the visual flow chart that models each customized integration process. In embodiments of the present disclosure, a hybrid endpoint integration process liaison system may operate within a service provider's on-site server or cloud server to analyze the storage locations of data to be accessed within an integration process. For example, data may be accessed from a trading partner's on-site or cloud-based storage location (e.g. database or server), a customer's on-site data center, a customer's public cloud storage location, a customer's private cloud storage location, or a service provider's public or private cloud-based storage location.

The hybrid endpoint integration process liaison system in an embodiment may access the visual model of a given integration process, as customized by the customer, in order to determine the beginning point of the data to be integrated (e.g. where the integrated data may be drawn from). In embodiments, the hybrid endpoint integration process liaison system may analyze further details of the visual model, including whether the beginning point of the integration process is firewall protected, whether the beginning point is on-site or cloud-based, the estimated volume of data elements to be stored at the endpoint location, the number of accesses of the beginning point location the integration process may require, and an estimated total time required to execute the integration process. Based on each of these considerations, the hybrid endpoint integration process liaison system in embodiments of the present disclosure may determine the most efficient or optimal location for execution of each of the code sets involved in the integration process. In one aspect, a runtime engine may be installed behind a customer-controlled firewall at a potential execution location by an administrator or other authorized user.

In other aspects, the hybrid endpoint integration process liaison system may further transmit a runtime engine via VPN or other secure access to a customer-controlled firewalled location (either on-site or in a private cloud) for execution of one or more code sets within the integration process. The runtime engine operating behind the firewall may then periodically poll the hybrid endpoint integration process liaison system to determine whether it should execute any code sets. The hybrid endpoint integration process liaison system may respond to such polling queries by determining which code sets should be executed behind the firewall, transmitting those code sets to the location of the runtime engine, and instructing the runtime engine to execute those code sets.

Examples are set forth below with respect to particular aspects of an information handling system for managing integration of electronic data records between an on-site data center and one or more private cloud storage modules.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the hybrid endpoint integration process liaison system 126 that may operate on servers or systems, remote data centers, or on-box in individual client information handling systems such as a local display device, or a remote display device, according to various embodiments herein. In some embodiments, it is understood any or all portions of code 124 for the hybrid endpoint integration process liaison system 126 may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, drive unit 110, or the computer readable medium 122 of the hybrid endpoint integration process liaison system 126 (volatile (e.g. random-access memory, etc.), nonvolatile (read-only memory, flash memory etc.) or any combination thereof). Additional components of the information handling system can include one or more storage devices such as static memory 106, drive unit 110, and the computer readable medium 122 of the hybrid endpoint integration process liaison system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a base video display unit 130, such as a liquid crystal display (LCD), an organic light emitting diode (OLED), a flat panel display, a solid state display, or other display device. Additionally, the information handling system 100 may include an alpha numeric control device 116, such as a keyboard, and another control device 114, such as a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on visual display 130. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface 112 are stored in a memory of the hybrid endpoint integration process liaison system 126.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 110, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 110 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute software for determining the optimal location for execution of a runtime engine for a specific integration process, and an API may enable interaction between the application program and device drivers and other aspects of the information handling system and software instructions 124 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 110, and the hybrid endpoint integration process liaison system 126 may include a computer-readable medium 122 such as a magnetic disk in an example embodiment. The computer-readable medium of the memory, storage devices and the hybrid endpoint integration process liaison system 104, 106, 110, and 126 may store one or more sets of instructions 124, such as software code corresponding to the present disclosure.

The disk drive unit 110, static memory 106, and computer readable medium 122 of the hybrid endpoint integration process liaison system 126 also contain space for data storage such as an information handling system for managing locations of executions of customized integration processes in endpoint storage locations. Data including but not limited to a connector code set, a trading partner code set, a data profile code set, and a runtime engine may also be stored in part or in full in the disk drive unit 110, static memory 106, or computer readable medium 122 of the hybrid endpoint integration process liaison system 126. Further, the instructions 124 of the hybrid endpoint integration process liaison system 126 may embody one or more of the methods or logic as described herein.

In a particular embodiment, the instructions, parameters, and profiles 124, and the hybrid endpoint integration process liaison system 126 may reside completely, or at least partially, within the main memory 104, the static memory 106, disk drive 110, and/or within the processor 102 during execution by the information handling system 100. Software applications may be stored in static memory 106, disk drive 110, and the hybrid endpoint integration process liaison system 126.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The hybrid endpoint integration process liaison system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the hybrid endpoint integration process liaison system 126. The hybrid endpoint integration process liaison system 126 may be operably connected to the bus 108, and/or may connect to the bus indirectly through the network 120 and the network interface device 118. The hybrid endpoint integration process liaison system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the hybrid endpoint integration process liaison system 126 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
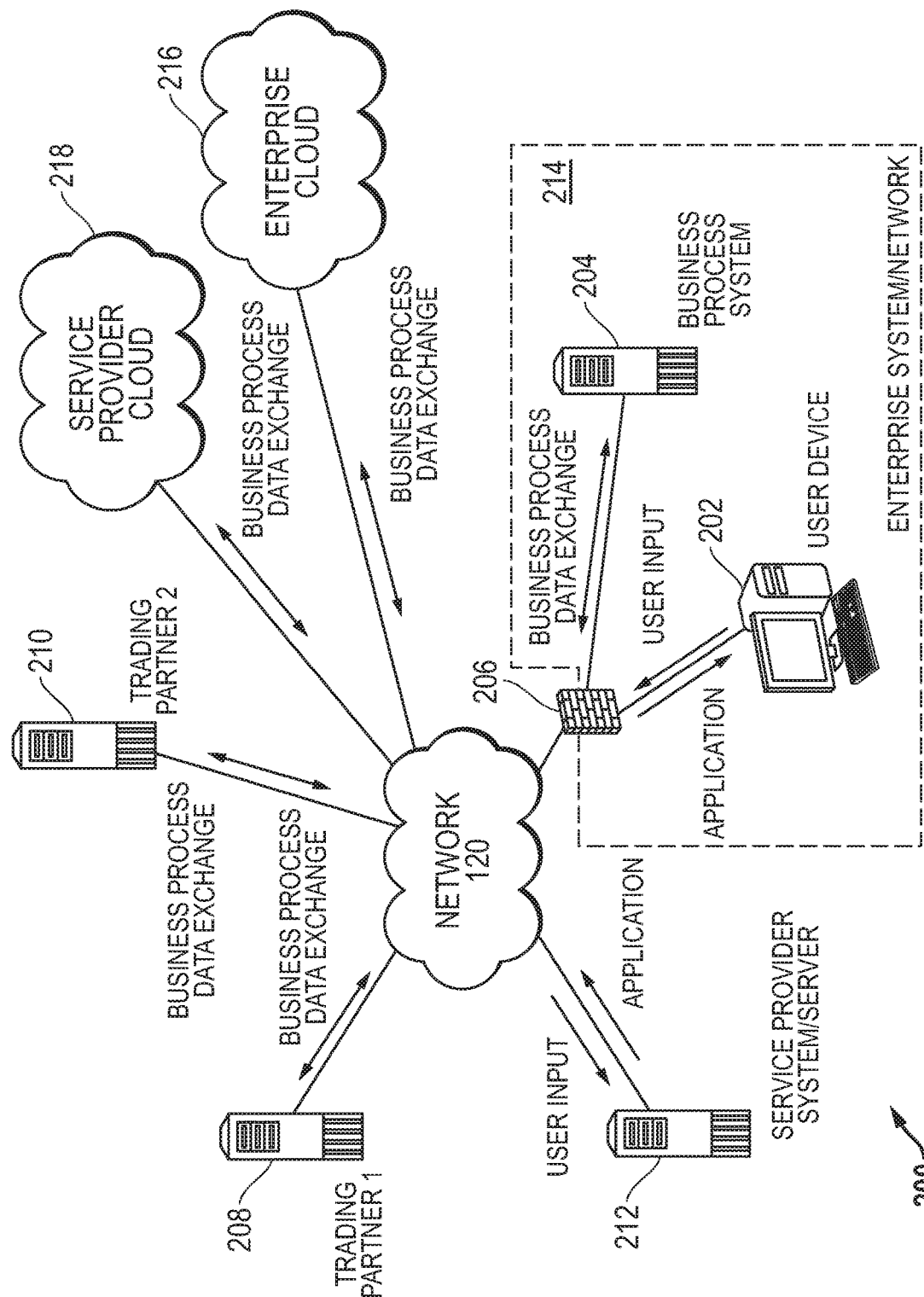
FIG. 2 is a block diagram illustrating a simplified integration network in an embodiment according to the present disclosure.

FIG. 2 is a block diagram illustrating a simplified integration network including an on-site data center, a customer controlled cloud storage module, and a service-provider controlled cloud storage module in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, Salesforce CRM or other enterprise resource planning software, Oracle's OneWorld JD Edward ERP, Infor's WMS Application, or many other types of databases.

In an embodiment, the integration network 200 may further include conventional hardware and software providing trading partners 208 and 210 for receiving and/or transmitting data relating to business-to-business transactions. It is contemplated such systems are conventional and well-known. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes of a type well known, including, but not limited to via the world wide web, and via FTP or SFTP.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may be specially configured to store certain pre-defined, i.e. pre-built, datasets in its memory. Such data may include a pre-defined container (also referred to herein as a "dynamic runtime engine") installation program that is executable at the enterprise system 214, at a third party server (not shown) located remotely from both the service provider system/server 212 and the enterprise system 214, within the enterprise cloud 216, and/or within the service provider cloud 218.

The runtime engine may operate to download or receive machine-readable, executable code instructions from the service provider server/system 212 in the form of code sets, which may include pre-built software code stored on the service provider system/server 212 such as connector code sets, trading partner code sets, and/or data profile code sets. The runtime engine may further operate to execute those code sets in order to perform an integration process or a portion of an integration process, providing for exchange of business integration data between the enterprise's business process system 204 and user device 202 within the enterprise network 214, and/or between the enterprise network 214 and trading partners 208 and 210, and/or between the enterprise's internal computing system 204 and the enterprise's computing systems external to the enterprise network 214, commonly referred to as SaaS (Software as a Service). For example, the application template in an embodiment may be constructed as an integration of customer data between Salesforce.com and Oracle systems using java programming technology.

A connector code set in an embodiment may correspond to a modeled integration process component, but may not itself be configured for use with any particular enterprise, or any particular trading partner. Accordingly, the connector code set may not yet be ready for execution to provide business integration functionality for any particular trading partner or enterprise until the connector code set is configured to be executable with additional code and/or data in the form of one or more integration data profile code sets incorporating user-specific information or trading partner specific information. Thus, the connector code set in an embodiment may be used by different enterprises or customers of the service provider 212. By configuring a connector code set to be executable with a data profile code set incorporating trading partner specific information, a user may instruct the creation of a trading partner code set.

The dynamic runtime engine may download to its location or receive at its location pre-built connector code sets, trading partner code sets, and/or data profile code sets from the service provider system/server 212, and execute the pre-built connector code sets, trading partner code sets, and/or data profile code sets according to a visual flowchart residing at the service provider server/system 212 and modeled by the user using a provided visual graphical user interface as described in greater detail below.

Data accessed pursuant to an integration process modeled by the user using the provided visual graphical user interface may be stored at an on-site data center within the enterprise system 214, within the enterprise cloud 216 (e.g. cloud-based customer controlled storage module), or within the service provider cloud 218 (e.g. cloud-based service provider controlled storage module). The location of the execution of each code set within the integration process may be determined by a hybrid endpoint integration process liaison system located within the service provider system/server 212 in an embodiment, based on the beginning and endpoints of the data to be accessed and manipulated pursuant to each integration process.

Figure 3:
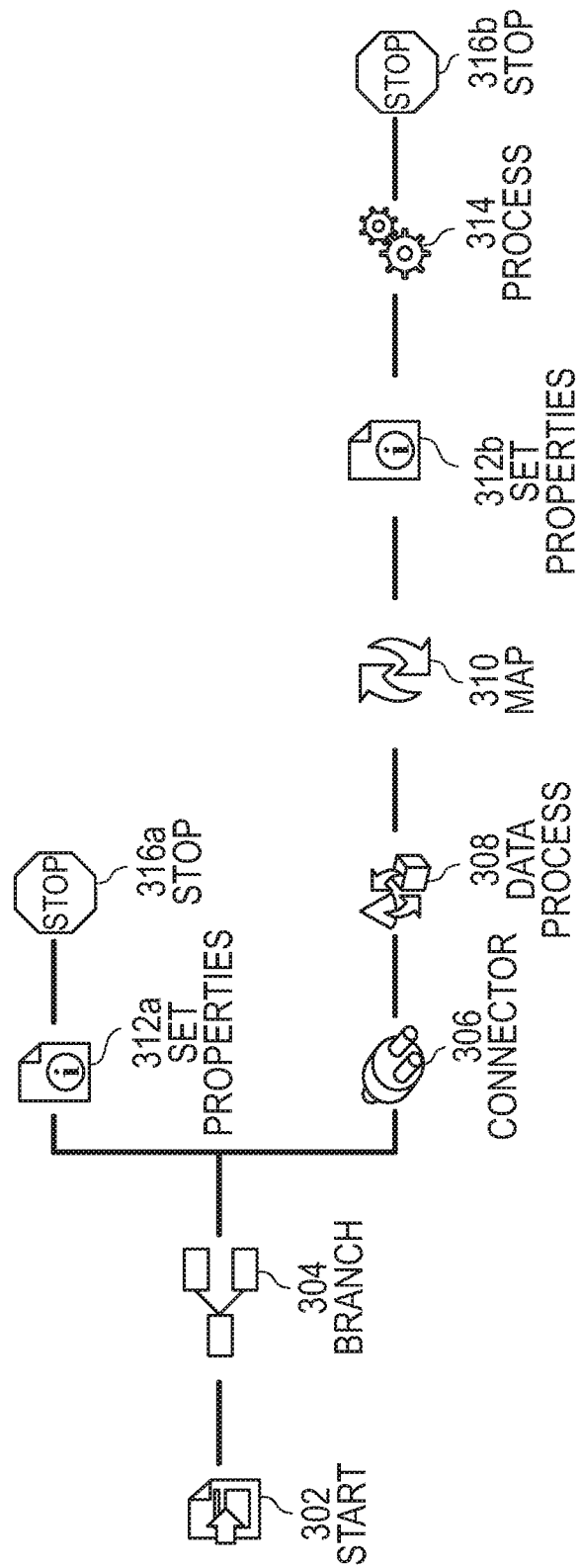
FIG. 3 is a block diagram illustrating a first user-generated flow diagram of an integration process according to an embodiment of the present disclosure.

FIG. 3 is a block diagram illustrating a first user-generated flow diagram of an integration process for exchange of electronic data records between an on-site data center and an onsite data center or cloud-based storage module according to an embodiment of the present disclosure. The user-generated flow diagram of an integration process for exchange of electronic data records may be established by a customized data integration software application creation system to allow a user to create a customized data integration software application by modeling a data integration process flow using a visual user interface. A user may model the process flow by adding visual elements representing integration process components which are associated with code sets incorporating machine-readable, executable code instructions for execution by a runtime engine. Each process component may be associated with an integration process action to be taken on incoming data. Each process component may further be associated with process component parameters detailing specific aspects of the process action to be taken. For example, a process component may instruct the runtime engine to take the action of querying a database, and the process component parameters may provide the name, location, user name, and required password for achieving the action of querying the database. Each process component parameter in an embodiment may be associated with a data profile code set. As described, the Dell Boomi® Application is an example of one such software application.

A user may generate a flow diagram in an embodiment by providing a chronology of process-representing visual elements via the use of a visual user interface. As discussed above, the visual user interface in an embodiment may provide a visual designer environment permitting a user to define process flows between applications/systems, such as between trading partner and enterprise systems, and between on-site data centers and cloud-based storage modules, and to model a customized business integration process. The visual user interface in an embodiment may provide a menu of pre-defined user-selectable visual elements and permit the user to arrange them as appropriate to model a process. The elements may include visual, drag-and-drop icons representing specific units of work (known as process components) required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the customized data integration software application creation system in the form of connector code sets, trading partner code sets, and/or data profile code sets.

Each process component may be identifiable by a process component type, and may further include an action to be taken. For example, a process component may be identified as a "connector" component. Each "connector" component, when chosen and added to the process flow in the visual user interface, may provide a drop down menu of different actions the "connector" component may be capable of taking on the data as it enters that process step. The action the user chooses from the drop down menu may be associated with a process component action value, which also may be associated with a connector code set. Further, the graphical user interface in an embodiment may allow the user to define the parameters of process components by providing user input, which the customized data integration software application creation system may correlate with a data profile code set, also stored in a memory of the customized data integration software application creation system.

In an embodiment, a user may choose a process component it uses often when interfacing with a specific trading partner, and define the parameters of that process component by providing parameter values specific to that trading partner. If the user wishes to use this process component, tailored for use with that specific trading partner repeatedly, the user may save that tailored process component as a trading partner component, which will be associated with a trading partner code set. For example, if the user often accesses the Walmart® purchase orders database, the user may create a database connector process component, associated with a pre-built connector code set that may be used with any database, then tailor the database connector process component to access the specific purchase order database owned and operated by Walmart® by adding process component parameters associated with one or more data profile code sets. If the user uses this process component in several different integration processes, the user may wish to save this process component for later use by saving it as a trading partner component, which will be associated with a trading partner code set. In the future, if the user wishes to use this component, the user may simply select the trading partner component, rather than repeating the process of tailoring a generic database connector process component with the specific parameters defined above.

The visual elements in an embodiment may indicate that the user wishes to perform a specific process upon a set of data, that specific process correlating to one or more connector code sets, trading partner code sets, and/or data profile code sets. Each of these code sets may be a pre-defined subset of code instructions stored at the system provider server/system in an XML format. The system provider server/system in an embodiment may generate a dynamic runtime engine for executing these pre-defined subsets of code instructions correlated to each individual process-representing visual element (process component) in a given flow chart in the order in which they are modeled in the given flow chart. The customized data integration software integration application in an embodiment is the set of code instructions represented by the process reflected in the flow chart created by the user (connector code sets or trading partner code sets), along with sets of code instructions correlating to received user input (data profile code sets), and along with the dynamic runtime engine(s) that executes these sets of code instructions.

As shown in FIG. 3, such process-representing visual elements may include, but may not be limited to a start element 302, a branch element 304, a data process element 308, a process call element 314, a connector element 306, set properties elements 312a and 312b, a map element 310, and stop elements 316a and 316b. Although each of these process-representing visual elements may correspond to a connector code set, they may not be configured for use with any particular enterprise or trading partner until further data attributes unique to the specific integration process are provided by the user in the form of user input associated with one or more integration process data profile code sets. Once the service provider server/system has received the user-generated flow diagram of the integration process and any necessary further user input in the form of data attributes unique to the specific integration process, the service provider server/system may generate one or more dynamic runtime engines, which are executable software applications capable of executing the code sets associated with an integration process in one of several different locations. For example, a dynamic runtime engine in embodiments of the present disclosure may be executed in the public cloud, at a customer controlled non-firewalled cloud or on-site location, or behind a customer firewall either within a private cloud or at an on-site location. In embodiments not involving a firewall, a runtime engine may be transmitted to any location in the cloud or on-site for execution of the code sets involved in the integration process. When initiated, the dynamic runtime engine in such embodiments may connect to the service provider system/server, automatically download the XML connector code sets, trading partner code sets, and/or data profile code set(s), and execute them according to the flowchart generated by the user to model the requested integration process.

If any portion of data to be integrated within the integration process is located behind a firewall, one or more runtime engines may execute at least a portion of the code sets within the integration process behind the firewall in some embodiments. In such embodiments, a hybrid endpoint integration process liaison system may analyze the visual elements within the visual flow chart, identify a first portion of visual elements to be executed behind the firewall, and identify a second portion of visual elements to be executed outside the firewall. The hybrid endpoint integration process liaison system may then associate the first portion of visual elements with a first runtime engine and the second portion of visual elements with a second runtime engine. The first runtime engine may then be installed behind the firewall, and the second runtime engine may be installed outside the firewall. Each runtime engine may automatically download the code sets associated with it, as described directly above, or may poll a hybrid endpoint integration process liaison system operating within the server provider system/server to determine which code sets it should execute. The hybrid endpoint integration process liaison system in such an embodiment may respond to such a poll or query by identifying the portion of code sets within the integration process associated with the querying runtime engine, transmitting the identified portion of code sets to the querying runtime engine, and instructing the querying runtime engine to execute the received code sets.

In an embodiment, a start element 302 may operate to begin a process flow, and a stop element 316a or stop element 316b may operate to end a process flow. As discussed above, each visual element may require user input in order for a particular enterprise or trading partner to use the resulting process. The start element 302 in an embodiment may further allow or require the user to provide data attributes unique to the user's specific integration process, including, but not limited to the source of incoming data to be integrated. For example, the customer in an embodiment may identify an on-site data center behind a firewall as the source of incoming data to be integrated. In such an embodiment, the hybrid endpoint integration process liaison system may associate the start element 302 with a first runtime engine installed behind the firewall.

In an embodiment, a branch element 304 may operate to allow simultaneous processes to occur within a single dynamic runtime engine installation program. The branch element 304 in an embodiment may further allow or require the user to provide data attributes unique to the user's specific integration process, including, but not limited to the number of processes the user wishes to run simultaneously within a single dynamic runtime engine installation program.

In an embodiment, a connector element 306 may operate to enable communication with various applications or data sources between which the user wishes to exchange data. The connector element 306 in an embodiment may further allow or require the user to provide data attributes unique to the user's specific integration process, including, but not limited to the operation the user wishes to perform on the data incoming from the source identified in the start element 302. For example, in an embodiment, the source of the data identified in start element 302 may be Salesforce.com, and the operation may include getting, sending, creating, deleting, updating, querying, filtering, or sorting of the data associated with a specific Salesforce.com account. A connector element in an embodiment may require the user to provide data attributes unique to the user's specific integration process, such as choosing the name for the outbound file and the storage location or endpoint for the outbound file.

In an embodiment in which the source of incoming data to be integrated is located behind a firewall, the connector element 306 may identify actions to be taken on data located behind the firewall that may be more efficiently executed behind the firewall, rather than outside the firewall. For example, repeated queries of the data, updates to the data, or deletion or creation of data stored behind the firewall may be more efficiently executed behind the firewall than executed via a VPN connection from a source outside the firewall. In such an embodiment, the hybrid endpoint integration process liaison system may associate the connector element 306 with the first runtime engine installed behind the firewall.

In other embodiments in which the source of incoming data to be integrated is located behind a firewall, the connector element 306 may identify actions to be taken on data located behind the firewall that may be more efficiently executed outside the firewall, rather than behind the firewall. For example, sending, filtering, or sorting of the data stored behind the firewall may be more efficiently executed outside the firewall, such that the manipulation does not require overhead resources located behind the firewall. In such embodiments, the data to be manipulated may be gathered behind the firewall by the first runtime engine, then transmitted outside the firewall for manipulation by a second runtime engine. In such an embodiment, the hybrid endpoint integration process liaison system may associate the connector element 306 with the second runtime engine installed outside the firewall. In some embodiments, multiple connector elements may exist within the visual flowchart, and a first portion of the multiple connector elements may be associated with the first runtime engine, and a second a second portion of the multiple connector elements may be associated with the second runtime engine.

In an embodiment, a data process element 308 may operate to manipulate document data within a process. The data process element 308 in an embodiment may further allow or require the user to provide data attributes unique to the user's specific integration process, including, but not limited to searching and replacing text, choosing to zip or unzip data, choosing to combine documents, choosing to split documents, or choosing to encode or decode data. For example, in an embodiment, a data process element may require the user to provide data attributes unique to the user's specific integration process, such as choosing a specific encryption type. In an embodiment in which the source of the data to be manipulated lies behind a firewall, the hybrid endpoint integration process liaison system may determine whether the data process element 308 is more efficiently executed behind the firewall or outside the firewall. The hybrid endpoint integration process liaison system in such an embodiment may then associate the data process element 308 with either a first runtime engine for execution behind the firewall, or with a second runtime engine for execution outside the firewall.

In an embodiment, a map element 310 may operate to transform data from one format to another or from one profile to another. The map element 310 in an embodiment may further allow or require the user to provide data attributes unique to the user's specific integration process, including, but not limited to the format to which the user wishes to transform the data. In an embodiment in which the source of the data to be manipulated lies behind a firewall, the hybrid endpoint integration process liaison system may determine whether the map element 310 is more efficiently executed behind the firewall or outside the firewall. The hybrid endpoint integration process liaison system in such an embodiment may then associate the map element 310 with either a first runtime engine for execution behind the firewall, or with a second runtime engine for execution outside the firewall.

In an embodiment, set properties elements 312a and 312b may operate to set values for various document and process properties. The set properties elements 312a and 312b in an embodiment may further allow or require the user to provide data attributes unique to the user's specific integration process, including, but not limited to a filename, or an email subject for the data being processed. In an embodiment in which the source of the data to be manipulated lies behind a firewall, the hybrid endpoint integration process liaison system may determine whether the set properties elements 312a and 312b are more efficiently executed behind the firewall or outside the firewall. The hybrid endpoint integration process liaison system in such an embodiment may then associate each of the set properties elements 312a and 312b with either a first runtime engine for execution behind the firewall, or with a second runtime engine for execution outside the firewall.

In an embodiment, a process element 314 may operate to execute another process from within a process (i.e. execute a sub process). The process element 314 in an embodiment may further allow or require the user to provide data attributes unique to the user's specific integration process, including, but not limited to the name of the process the user wishes to become a sub process of the process within the flow diagram. In an embodiment in which the source of the data to be manipulated lies behind a firewall, the hybrid endpoint integration process liaison system may determine whether the process element 314 is more efficiently executed behind the firewall or outside the firewall. The hybrid endpoint integration process liaison system in such an embodiment may then associate the data process element 314 with either a first runtime engine for execution behind the firewall, or with a second runtime engine for execution outside the firewall.

The visual elements shown in FIG. 3 represent only a few examples of visual elements representing data integration processes, and it is contemplated the visual user interface may use other visual elements representing any type of data integration process that could be performed.

As described herein, the hybrid endpoint integration process liaison system in an embodiment may reference the visual elements representing data integration processes, such as those shown in FIG. 3 to estimate the volume of data to be accessed and manipulated or integrated prior to execution of the integration process. The hybrid endpoint integration process liaison system in an embodiment may make such an estimation based on analysis of several factors associated with the integration process visual flow model generated by the customer in the visual interface. For example, the hybrid endpoint integration process liaison system in embodiments may estimate the volume of data records based on the number or type of branch elements 304, data process elements 308, process elements 314, connector elements 306, set properties elements 312a and 312b, and map elements 310 used, depth of information contained within each set properties 312 element, number of concurrent process elements 314 that will be enacted, and/or analytics of previous executions of the modeled integration process.

Figure 4:
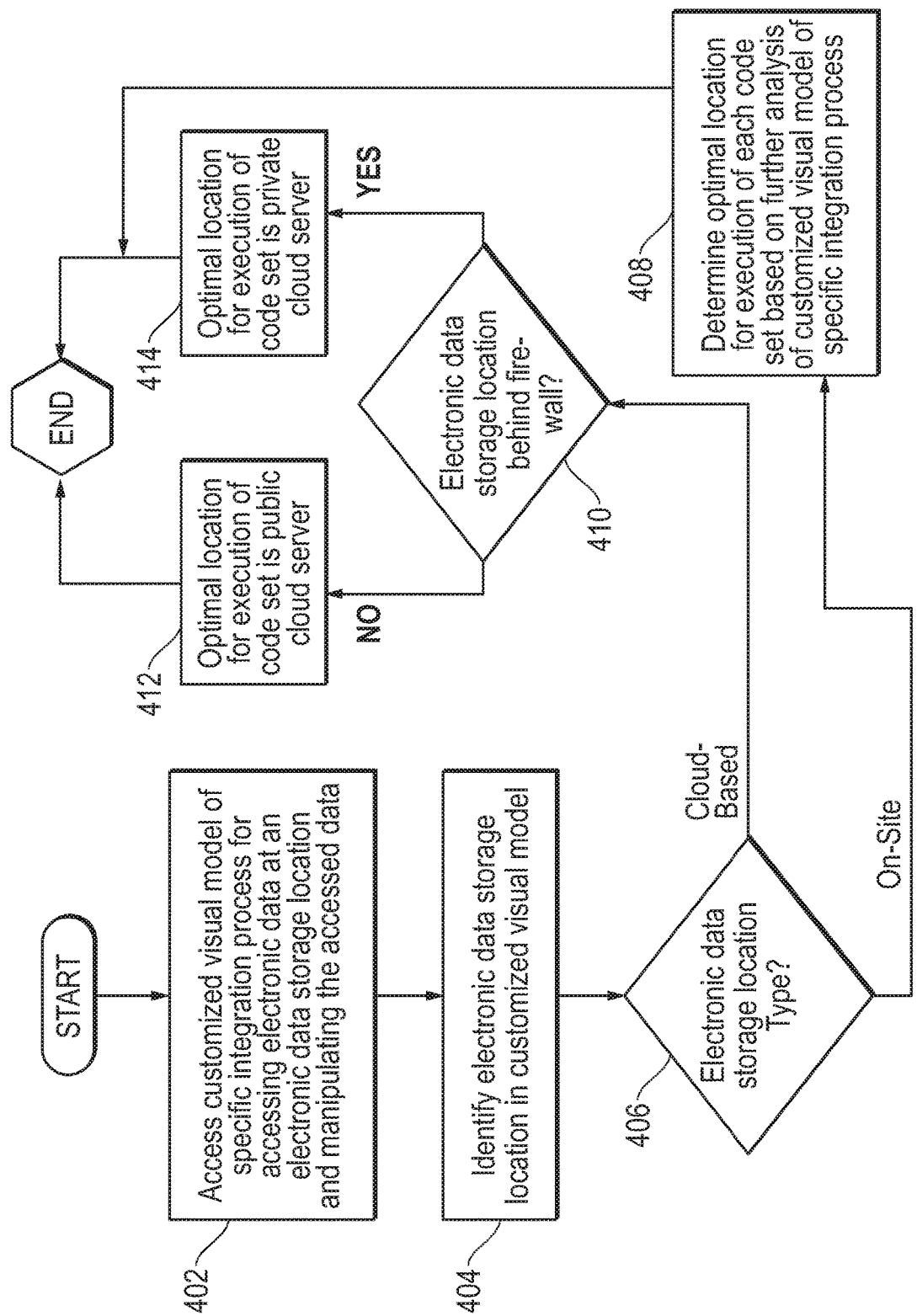
FIG. 4 is a flow diagram illustrating a first method of determining an optimal code set execution location according to an embodiment of the present disclosure.

FIG. 4 is a flow diagram illustrating a first method of determining an optimal code set execution location for data to be accessed and manipulated from a cloud-based starting point according to an embodiment of the present disclosure. As shown in FIG. 4, at block 402 in an embodiment, the hybrid endpoint integration process liaison system may access the customized visual model of the specific integration process for accessing electronic data stored at an electronic data storage location and manipulating the accessed data. For example, in the embodiment described with reference to FIG. 3, the hybrid endpoint integration process liaison system may identify the source of the data to be manipulated by referencing the start element 302. The hybrid endpoint integration process liaison system in an embodiment may access the customized visual models in a main memory residing within a service provider's server/system.

Returning to FIG. 4, at block 404, in an embodiment, the hybrid endpoint integration process liaison system may identify the electronic data storage location in the customized visual model. The customized data integration software application for the user-generated flow diagram of the integration process for exchange of electronic data records represented by the customized visual model may be parsed by the hybrid endpoint integration process liaison system for management of execution location of codesets associated with steps of the customized integration. As described above, parsing the customized integration process may require data to be accessed from a trading partner's on-site or cloud-based storage location (e.g. database or server), a customer's on-site data center, a customer's public cloud storage location, a customer's private cloud storage location, a service provider's public or private cloud-based storage location, or any combination of the above options. Thus, for any given customized visual model of a specific integration process in embodiments described herein, the electronic data storage location or starting point for data to be accessed and manipulated during integration operations may include a customer's on-site data center, a customer's public cloud storage location, a customer's private cloud storage location, or a service provider's public or private cloud-based storage location.

At block 406, in an embodiment, the hybrid endpoint integration process liaison system may determine whether the electronic data storage location is a cloud-based storage system or an on-site data center. Many businesses do not store their proprietary documentation in the cloud. Cloud-based storage systems often employ different file structures than on-site data centers, such as, for example, elastic file systems rather than static file systems maintained by an IT specialist. As such, integration of data between on-site data centers and cloud-based storage modules such as servers maintained remotely from the customer and controlled by a third-party service provider may include more complex processes with more steps taken to manipulate the data than cloud-to-cloud integrations. If the electronic data storage location type is on-site, the method may proceed to block 408. If the electronic data storage location type is cloud-based, the method may proceed to block 410.

At block 408 in an embodiment in which the electronic data storage location is on-site, the hybrid endpoint integration process liaison system may determine the optimal location for execution of each code set in the integration process based on further analysis of the customized visual model of the specific integration process. As described directly above, integration of data between on-site data centers and cloud-based storage modules such as servers maintained remotely from the customer and controlled by a third-party service provider may include more complex processes with more steps taken to manipulate the data than cloud-to-cloud integrations. Thus, if the electronic data storage location is determined to be an on-site data center, further analysis, for example, pursuant to the embodiment described with respect to FIG. 5 may be required before identification of the optimal location for execution of each code set in the customized integration process may be made. The process of FIG. 4 may then end.

At block 410 in an embodiment in which the electronic data storage location is cloud-based, the hybrid endpoint integration process liaison system may determine whether the electronic data storage location is protected by a firewall. For example, as described above with reference to FIG. 2, the data to be accessed and manipulated may be located within an on-site customer enterprise system 214, which may or may not be located behind firewall 206. If the data to be accessed and manipulated is located behind a firewall, security credentials may be required in order to access the data. In some embodiments, integration processes accessing data behind a firewall may be executed entirely behind the firewall following delivery of the runtime engine to a person having security credentials to download the runtime engine and all associated code sets within the enterprise system. In other embodiments, integration processes accessing data behind a firewall may be executed partially or entirely outside the firewall, and the documents may be accessed via a VPN tunnel.

In embodiments where data to be accessed is located behind a firewall, this may indicate the data, once accessed and manipulated pursuant to the integration process may need to be manipulated in a similarly secure location, such as, for example, a private cloud location. The private cloud location in such an embodiment may be a customer-controlled private cloud, or a cloud-based storage location controlled by a third party provider such as the service provider for the hybrid endpoint integration process liaison system or some other third party provider. In embodiments where the data to be accessed is not located behind a firewall, this may indicate the accessed data may be manipulated in a public cloud storage module not requiring a firewall, such as a customer-controlled or third party controlled public cloud server. If the electronic data storage location is not located behind a firewall, the method may proceed to block 412. If the electronic data storage location is located behind a firewall, the method may proceed to block 414.

At block 412, in an embodiment in which the electronic data storage location is a cloud-based location not behind a firewall, the hybrid endpoint integration process liaison system may determine the optimal location for execution of one or more code sets associated with manipulation of the data in the integration process is a public cloud server. For example, in an embodiment, the hybrid endpoint integration process liaison system may identify the optimal location for execution of one or more code sets in the integration process is a public cloud server identified by the last connector element in the visual model of the integration process. As another example, in an embodiment, the hybrid endpoint integration process liaison system may identify a location with the service provider's public cloud as the optimal location for execution of one or more code sets associated with manipulation of the data in the integration process.

At block 414, in an embodiment in which the electronic data storage location is a cloud-based location behind a firewall, the hybrid endpoint integration process liaison system may determine the optimal location for execution of one or more code sets in the integration process is a private cloud server. For example, in an embodiment, the hybrid endpoint integration process liaison system may identify the optimal location for execution of one or more code sets associated with manipulation of the data in the integration process is a private cloud server identified by the last connector element in the visual model of the integration process. As another example, in an embodiment, the hybrid endpoint integration process liaison system may identify a location with the service provider's private cloud as the optimal location for execution of one or more code sets associated with manipulation of the data in the integration process.

Figure 5:
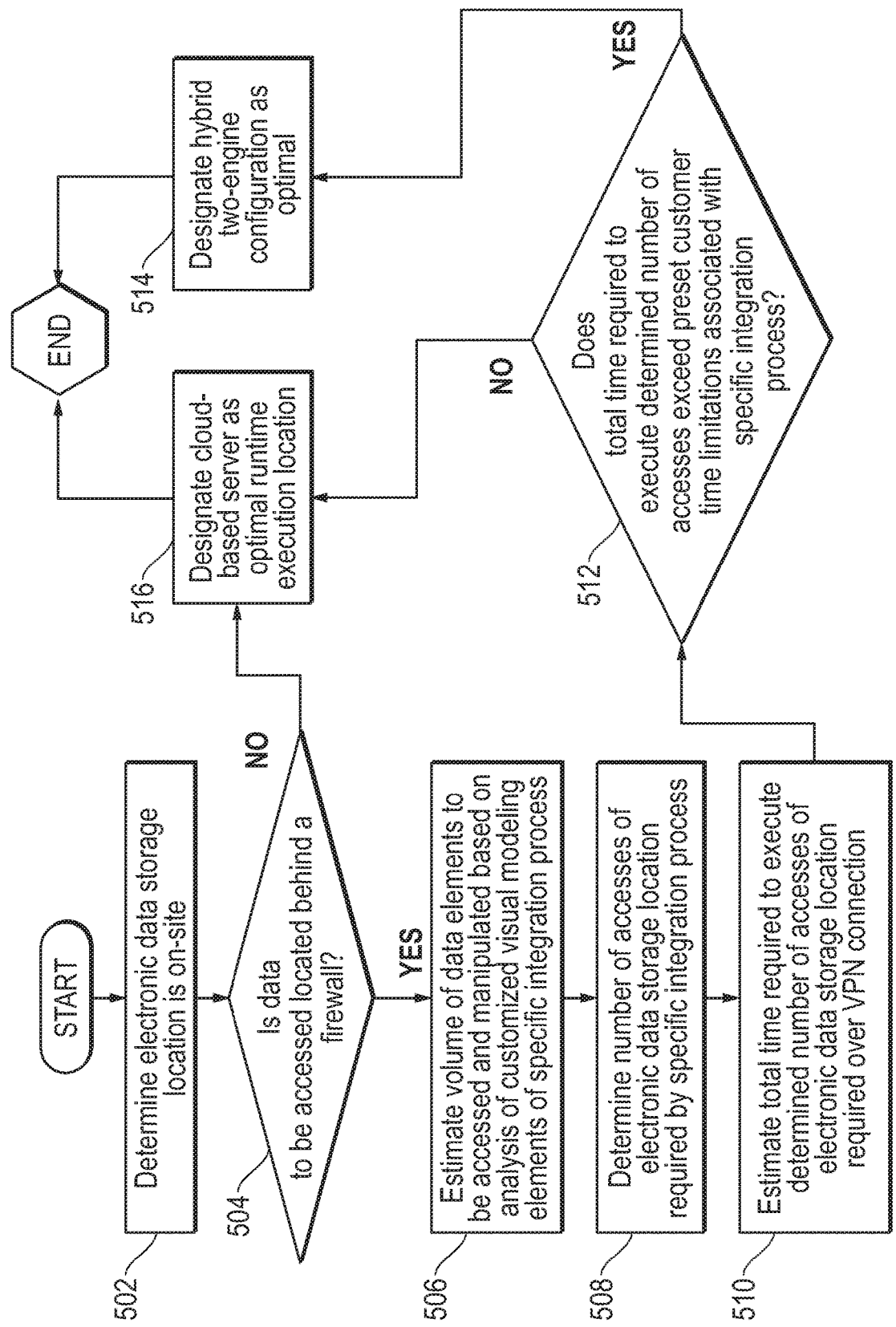
FIG. 5 is a flow diagram illustrating a second method of determining an optimal code set execution location according to an embodiment of the present disclosure.

FIG. 5 is a flow diagram illustrating a second method of determining an optimal code set execution location for data to be accessed and manipulated from an on-site data center starting point according to an embodiment of the present disclosure. Each code set in an embodiment in which some or all of the data to be accessed and manipulated lies behind one or more firewalls may be executed either behind the firewall at the customer's on-site data center, or outside the firewall (e.g. within a public or private cloud-based server). The hybrid endpoint integration process liaison system in an embodiment allows for the execution of some code sets associated with an integration process behind the firewall, and execution of other code sets associated within the same integration process outside the firewall. The method of FIG. 5 illustrates a method for automatically determining an optimal execution location for each of the code sets associated with a single visual flowchart modeling an integration process.

In some scenarios it is advantageous to execute code sets outside the firewall. For example, executing code sets involving manipulation of data may offload the computing overhead associated with execution of at least a portion of the integration process from the on-site customer's data center, and redistribute it to a cloud location. In such a way, the customer may free up more local computing resources for other tasks that are required to occur on-site.

In other scenarios, it is advantageous to execute code sets from behind the firewall. For example, code sets involving accessing data located behind a firewall may require repeated queries or fetches of data located behind the firewall. Execution of such code sets outside the firewall may require each query or fetch to occur over a VPN tunnel through the firewall. Communication via VPN may slow down each attempted access. In contrast, execution of such code sets from behind the firewall may be completed without the use of the VPN communication, and may prove more efficient than execution from outside the firewall.

At block 502, in an embodiment, the hybrid endpoint integration process liaison system may determine the electronic data storage location is on-site. As described above in the embodiment described with respect to FIG. 4 at block 408, if the electronic data storage location is determined to be an on-site data center, the hybrid endpoint integration process liaison system may execute a more in-depth analysis of the visual model in order to identify the optimal location for execution of each of the code sets.

At block 504, in an embodiment, the hybrid endpoint integration process liaison system operating the runtime engine execution location system may determine whether the data to be accessed is located behind a firewall. The runtime engine execution location system in an embodiment may determine this by analyzing the start and connector elements within the visual model to identify whether VPN credentials or other security credentials are required for access to any portion of the data to be integrated. Accessing data located behind a firewall from outside the firewall in an embodiment may involve routing all access attempts through a VPN tunnel through the firewall. Communication via VPN may slow down each attempted access. Thus, if any portion of the data to be integrated lies behind a firewall, it may be more efficient to execute some or all of the code sets within the integration process behind the firewall, where communication via a VPN tunnel may not be necessary. If the data to be accessed is located behind a firewall, the method may proceed to block 506, in order to determine if execution or one or more code sets behind the firewall may be more efficient.

If the data to be accessed in an embodiment is not located behind a firewall, communication via a VPN tunnel may not be necessary, and inefficiencies of such a communication system may not be an issue. In such embodiments, execution of one or more code sets in the cloud may be equally efficient as execution of one or more code sets on-site. However, execution of code sets associated with manipulation of data in the cloud may offload the computing overhead associated with execution of at least a portion of the integration process from the on-site customer's data center, and redistribute it to a cloud location. In such a way, the customer may free up more local computing resources for other tasks that are required to occur on-site. The method in such embodiments may proceed to block 516, where one or more code sets may be designated for execution within the cloud.

At block 506, in an embodiment, the runtime engine execution location system may estimate the volume of data elements to be accessed behind a firewall and manipulated based on analysis of customized visual modeling elements of the specific integration process. The runtime engine execution location in embodiments where the electronic data storage location is on-site may include, but may not be limited to: (1) hybrid execution of a portion of the integration process at the electronic data storage location and a portion of the integration process at a cloud-based server; and (2) execution entirely within the cloud-based server, as described directly above. In the first of these possible scenarios, the hybrid endpoint integration process liaison system may generate two separate runtime engines, each responsible for executing a portion of the code sets associated with the integration process. For example, a first runtime engine in an embodiment may execute partially on-site to access the data stored behind the firewall, and transmit the data to a cloud-based location for further manipulation. A second runtime engine in such an embodiment may then access the data transmitted to the cloud-based location and execute code sets associated with manipulation of the data entirely within the cloud.

In some embodiments, accessing and transmitting the data to a cloud-based location may involve accessing the data and storing it to a temporary file folder located behind the firewall. In such an embodiment, the first runtime engine may wait until all gathering of data is complete, then transmit all of the accessed data from the temporary file folder to the cloud-based location for further manipulation. Due to the storage of the data in the on-site temporary folder, the hybrid scheme may be employed in such an embodiment when the on-site data center has storage capacity large enough to effectively store a copy of the all of the data to be accessed and manipulated.

In such an embodiment involving storage of data in a temporary file folder behind the firewall, the hybrid endpoint integration process liaison system may access analytics stored in memory that describe previous executions of the same or similar integration processes to gauge the volume of data accessed and manipulated in those previous integrations. If the volume of the data to be accessed and manipulated can be estimated in such an embodiment, the hybrid endpoint integration process liaison system may compare that estimated volume to a preset value of customer storage space available, as provided by each customer with an on-site data center. If the volume of the data to be accessed and manipulated cannot be estimated in such an embodiment, the hybrid endpoint integration process liaison system in an embodiment may assume the on-site data center does not have sufficient storage space for a temporary folder required for the hybrid solution. In other embodiments, customers operating the on-site data center may specify whether temporary folders of this type are preferable or non-preferable for incorporation into integration processes.

In other embodiments, it may be assumed that sufficient space exists behind the firewall for storage of accessed data in the temporary file folder. In yet other embodiments, accessing and transmitting the data to a cloud-based location may involve the first runtime engine automatically transmitting data as it is accessed using a buffer technique, not requiring temporary storage behind the firewall. In such embodiments block 506 may not be necessary, and may be omitted from the process flow.

At block 508 in an embodiment, the runtime engine execution management system may determine the number of accesses of the electronic data storage location behind the firewall required by the specific integration process. As described herein, accessing data located behind a firewall from outside the firewall in an embodiment may involve routing all access attempts through a VPN tunnel, which may slow down each attempted access. In order to determine if it is more efficient to execute some or all of the code sets within the integration process behind the firewall, where communication via a VPN tunnel may not be necessary, the hybrid endpoint integration process liaison system must first gauge how inefficient communication via the VPN tunnel may be during execution of the specific integration process to be executed. The total time required to execute the full integration process via VPN may be higher in embodiments involving a higher number of repeated accesses occurring via VPN, and may be lower in embodiments involving only a few communications via VPN. The number of access attempts included in each integration process may be gauged by analyzing the number and type of connector elements employed in the visual model.

At block 510, in an embodiment, the hybrid endpoint integration process liaison system may estimate the total time required to execute the determined number of accesses of the electronic data storage location required if all code sets for the integration process are executed in the cloud-based server. In several example embodiments, the customized data integration software application creation system provided by a service provider for customized integration process development may draw from data and resources recorded from previous experiences with accesses of data at locations behind firewalls or at other locations during the course of integrations. The infrastructure such as processing and memory resources at various locations, as well as security barriers implemented, may have been encountered from previous customized integrations. The time and effort required to navigate such infrastructure and security apparatus types to conduct similar elements or steps of integration processes may have been previously logged during other, similar integration processes. For example, if the integration process involves communications over a VPN tunnel, the latency of communication via the VPN tunnel may cause increased time to complete the integration process, depending on the volume of data to be accessed over the VPN connection, and the number of accesses required by the integration process. In such a scenario, the hybrid endpoint integration process liaison system may need to balance the need to complete the integration process in a timely manner with the need to offload computing overhead associated with execution of the integration process to the cloud in order to determine whether it would be more efficient to execute code sets behind the firewall or outside the firewall.

At block 512, in an embodiment, the runtime engine execution management system may determine whether the total time required to execute the determined number of accesses (e.g. if all of the code sets are executed at the cloud-based server) exceeds a preset customer time limitation associated with the specific integration process. The preset customer time limitation and the estimation of total time required at 510 may be based on data drawn from logged operations from previous integration processes conducted by the service provider of customized data integration software application creation system. This data may be used to establish average times that similar data levels or number of accesses, security apparatus systems, and available infrastructures will take to access electronic data or provide a result in an integration step. The hybrid endpoint integration process liaison system in an embodiment may compare the time estimated at block 510 to a preset time period provided for the customer that indicates a customer-approved length of time an integration process may take to complete. In other embodiments, the customized data integration software application creation system service provider may set a length of time threshold limitation maximum in determination of when to implement a hybrid execution scheme versus accessing secure locations via other means.

If the total time required to execute the determined number of accesses does not exceed the preset customer time limitation, the hybrid endpoint integration process liaison system may determine the benefits of offloading the computing overhead associated with execution of code sets to the cloud outweighs any potential disadvantages associated with executing those code sets over a VPN tunnel. In such embodiments, the method may proceed to block 516.

If the total time required to execute the determined number of accesses exceeds the preset customer time limitation, the hybrid endpoint integration process liaisons system may determine the disadvantages associated with executing some code sets over a VPN tunnel may outweigh the potential benefits of offloading the computing overhead associated with execution of code sets to the cloud. In such embodiments, the method may proceed to block 514.

At block 514, in an embodiment, the hybrid endpoint integration process liaison system may designate the hybrid plural-engine configuration, involving execution of some of the code sets behind the firewall as optimal. In an embodiment in which the total time required to execute the determined number of accesses in a process executed from the cloud-based server exceeds the preset customer time limitation, use of the hybrid configuration may be most optimal. In such a scenario, the hybrid endpoint integration process liaison system may associate a first portion of the code sets with a first runtime engine installed behind the firewall and associate a second portion of the code sets with a second runtime engine installed outside the firewall, as described in greater detail herein.

In other embodiments, the hybrid plural-engine configuration may be designated as a default optimal solution. In such embodiments, any time the hybrid endpoint integration process liaison system determines the data to be accessed is located behind a firewall, the hybrid endpoint integration process liaison system may automatically associate a first portion of code sets with a first runtime engine installed behind the firewall and associate a second portion of code sets with a second runtime engine installed outside the firewall. In such embodiments, blocks 506-512 may be omitted from the method of FIG. 5. At this point, the method may end.

At block 516, in an embodiment, the hybrid endpoint integration process liaison system may designate the cloud-based server as the optimal location for execution of all code sets in the integration process. As described herein, execution of code sets associated with manipulation of data in the cloud may offload the computing overhead associated with execution of at least a portion of the integration process from the on-site customer's data center, and redistribute it to a cloud location. In such a way, the customer may free up more local computing resources for other tasks that are required to occur on-site. If the data to be accessed in an embodiment is not located behind a firewall, communication via a VPN tunnel may not be necessary, and inefficiencies of such a communication system may not be an issue. In other embodiments, the hybrid endpoint integration process liaison system may determine the benefits of offloading the computing overhead associated with execution of code sets to the cloud outweighs any potential disadvantages associated with executing those code sets over a VPN tunnel. In both of these scenarios, the hybrid endpoint integration process liaison system may associate the code sets of the integration process with a single runtime engine installed outside the firewall, thus freeing up local computing resources at the customer's on-site data center. At this point, the method may end.

Figure 6:
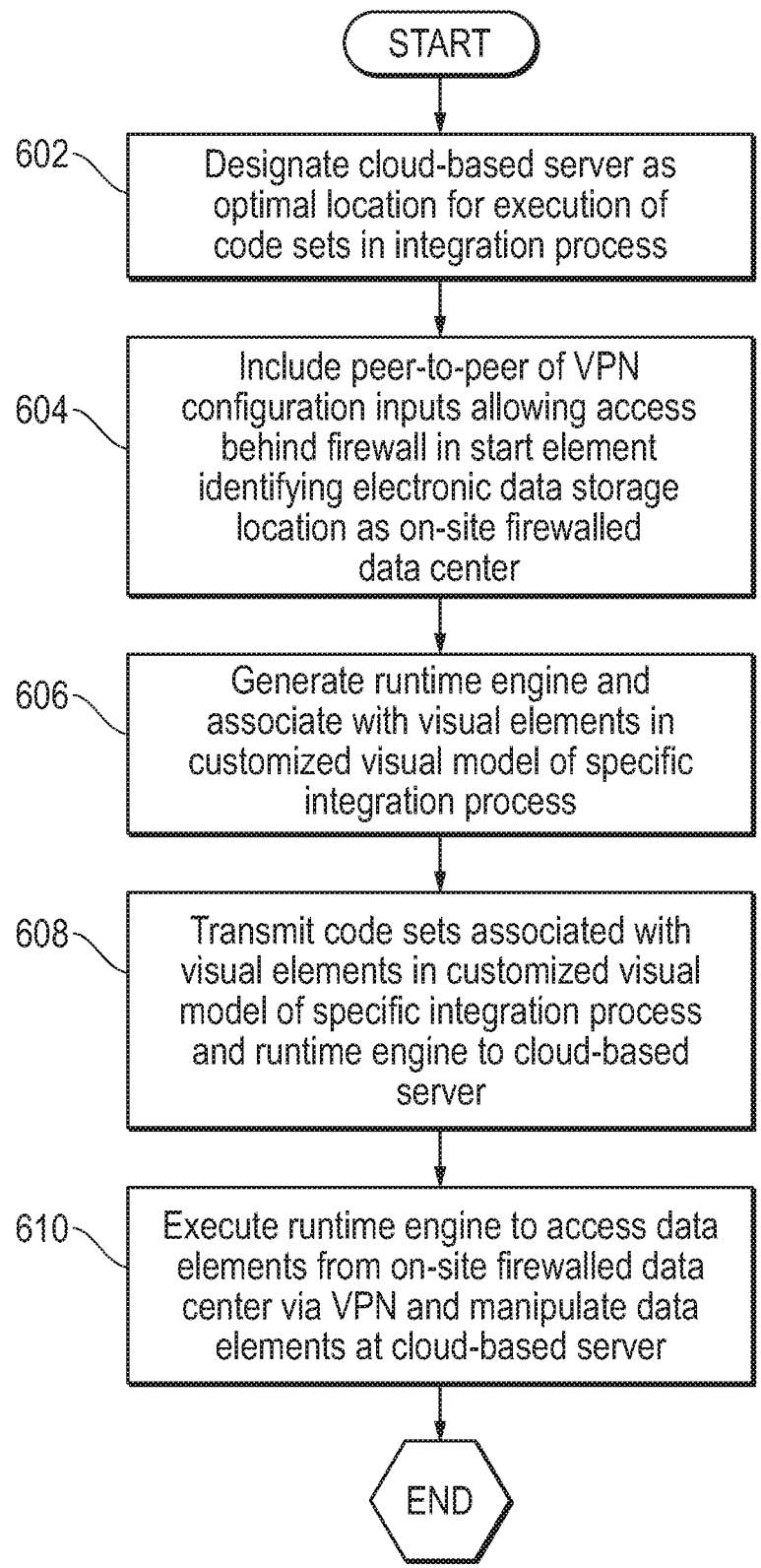
FIG. 6 is a flow diagram illustrating a method of executing a runtime engine at an optimal single location according to an embodiment of the present disclosure.

FIG. 6 is a flow diagram illustrating a method of executing a runtime engine accessing documents behind a firewall through a VPN tunnel at an optimal single location according to an embodiment of the present disclosure. As described herein, the hybrid endpoint integration process liaison system in an embodiment may determine the most optimal configuration for execution of the integration process includes execution of a single runtime engine at a cloud-based server. In such a scenario, the runtime engine may execute all code sets associated with the visual model of the integration process, and may access data stored at the on-site location via a network or VPN tunnel.

At block 602 in an embodiment, the hybrid endpoint integration process liaison system may designate the cloud-based server as the optimal location of the runtime engine for execution of all code sets in the integration process. As described herein, this may occur when it is determined execution of the entire integration process from a single runtime engine at the cloud-based server can be completed within a time frame acceptable to the client, and/or when the data to be accessed is not located behind a firewall.

At block 604, in an embodiment, the hybrid endpoint integration process liaison system may insert a peer-to-peer or VPN configuration input allowing access behind a firewall in a start element identifying the electronic data storage location as the on-site firewalled data center. In some embodiments, such as if the on-site data center where the data to be accessed is currently stored is located behind a firewall, a VPN connection between the on-site location and the cloud-based server where the data will be manipulated pursuant to the integration process may need to be established in order to execute the integration process. In other embodiments, such as if the on-site data center where the data to be accessed and manipulated is currently stored is not located behind a firewall, a peer-to-peer network connection between the on-site location and the cloud-based server may not need to be established in order to execute the migration.

As described above with reference to FIG. 3, each visual model of an integration process may begin with a start element 302, and a customer may identify within a start element 302 the location of the documents to be accessed and manipulated or integrated. Start element 302 may also allow a user to provide network configurations (e.g. addresses) that allow an engine executed at a location that is remote from the on-site data center from which data is to be accessed and manipulated but is connected to the on-site data center via a network to access the on-site data via the network. Start element 302 may further allow customers to provide VPN credentials that will allow a runtime engine executed outside a firewall to access data stored at the identified location if that identified location is located behind a firewall. Thus, returning to FIG. 6, at block 604, upon determining the runtime engine should be located remotely from the on-site location, the hybrid endpoint integration process liaison system in an embodiment may insert into the start element either a peer-to-peer network configuration and/or VPN credentials needed to execute the integration process remotely from the on-site location.

At block 606, in an embodiment, the hybrid endpoint integration process liaison system may generate a single runtime engine and associate it with the visual elements in the customized visual model of the specific integration process. As described herein, each visual element representing integration process components in an embodiment may be associated with code sets incorporating machine-readable, executable code instructions for execution by a runtime engine. As also described herein, customized data integration software in an embodiment may include a runtime engine for execution of one or more of such code sets. The hybrid endpoint integration process liaison system in an embodiment may generate a single runtime engine for execution of the integration process described in the visual model. By associating of each of the code sets associated with each of the visual elements within the visual model with this single runtime engine, the hybrid endpoint integration process liaison system readies the runtime engine for execution of each of these code sets.

At block 608, in an embodiment, the hybrid endpoint integration process liaison system may transmit the code sets associated with the visual elements in the customized visual model of the specific integration process and the single runtime engine to the cloud-based server. Upon determining the cloud-based server is the optimal execution location for the runtime engine and generation of said single runtime engine, the hybrid endpoint integration process liaison system may transmit the runtime engine and the code sets with which it is associated, as with block 606 to the optimal cloud-based location. For example, the hybrid endpoint integration process liaison system may transmit the runtime engine and all code sets associated with visual elements 302-316 shown in FIG. 3 to the cloud-based server.

Returning to FIG. 6, at block 610, the runtime engine may execute to access data elements from the on-site firewalled customer data center and manipulate those data elements at the cloud-based server. The runtime engine may execute pursuant to an explicit instruction from the service provider, at a pre-specified time, or repeatedly according to a pre-specified schedule. Execution of the runtime engine at the cloud-based server may occur completely autonomously, requiring no action on the part of the customer, including determination of the optimal location for execution of the runtime engine. At this point the portion of the integration operation of FIG. 6 may end.

Figure 7:
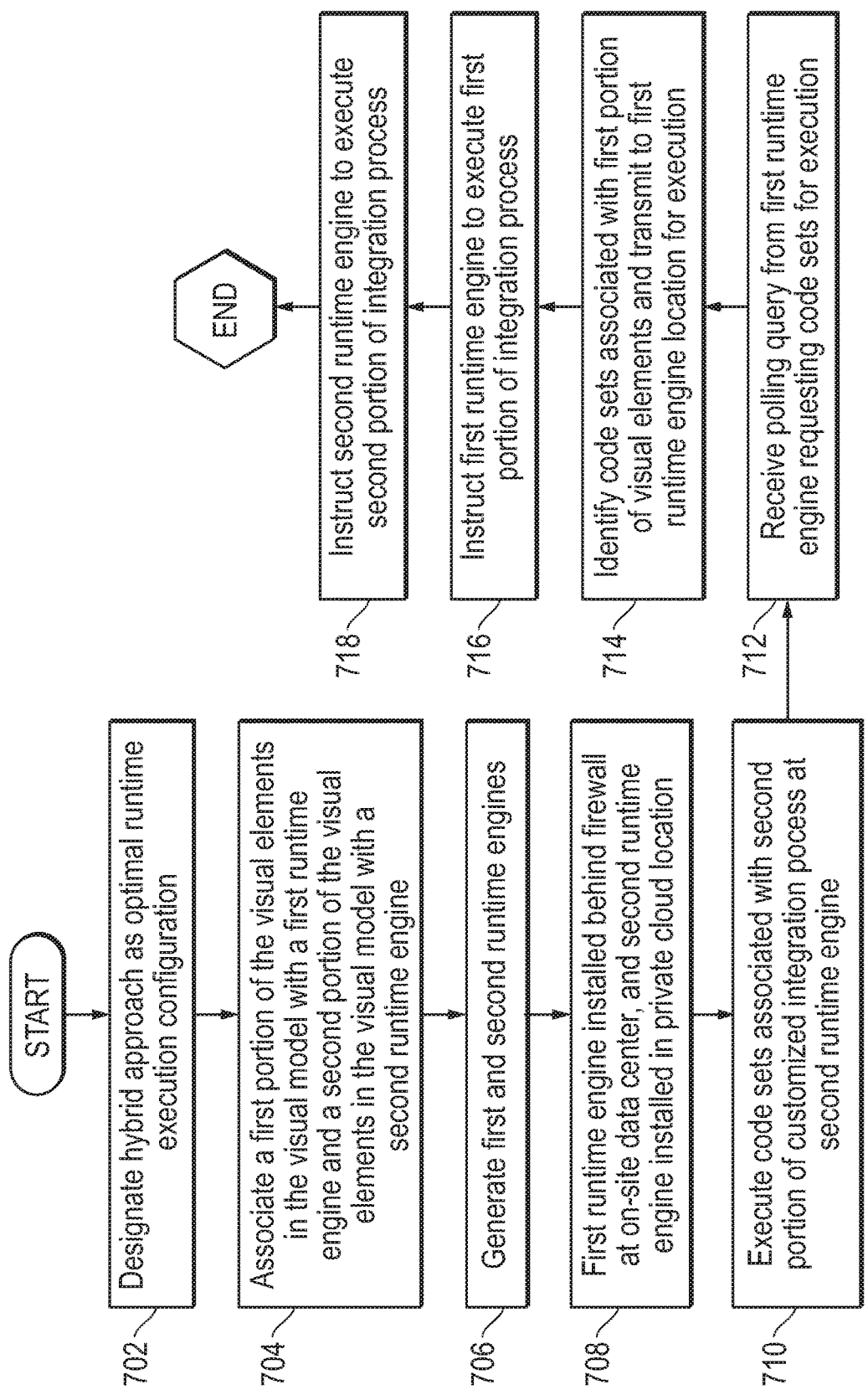
FIG. 7 is a flow diagram illustrating a method for executing a plurality of runtime engines at multiple locations according to an embodiment of the present disclosure.

FIG. 7 is a flow diagram illustrating a method for executing a plurality of runtime engines at multiple locations pursuant to a hybrid execution location scheme according to an embodiment of the present disclosure. As described herein, the hybrid endpoint integration process liaison system in an embodiment may determine the most optimal configuration for execution of a customized integration process includes execution of two runtime engines, where a first runtime engine executes a portion of the customized integration process at the on-site location behind the firewall and a second runtime engine executes another portion of the integration process at the cloud-based server outside the firewall. It may be appreciated that in various embodiments, a customized integration may be parsed such that multiple runtime engines may be implemented at plural locations behind firewalls or at cloud locations for execution of a more complex hybrid execution location scheme for implementing a customized integration process according to the embodiments herein. The method of FIG. 7 illustrates parsing the customized data integration software application, such as from a user-generated flow diagram of the customized integration process for exchange of electronic data records that may come from a plurality of sources and be integrated into records or files for distribution or manipulation at a variety of additional locations required by the customized integration. Those multiple execution locations may be behind a firewall at customer controlled on-site locations, private cloud locations, public cloud locations or the like as described in various embodiments herein. The method for parsing a executing a plurality of runtime engines at multiple locations may be seamlessly executed by the hybrid endpoint integration process liaison system such that the customized integration according to an originally-generated flow diagram may be automatically parsed and distributed with respect to the execution of one or more portions of the integration code sets according the various embodiments herein.

At block 702, in an embodiment, the hybrid endpoint integration process liaison system may designate the hybrid approach as the optimal runtime execution configuration based on parsing the customized integration process generated via a user-generated visual flow diagram as requiring at least part of the integration process to access data at a location behind a firewall or other security barrier requiring access credentials such that location of a runtime engine behind the firewall or other security apparatus may be desirable to streamline access. In such embodiments, the hybrid plural-engine configuration may be designated as a default optimal solution. In another embodiment, the total time required to access the data to be manipulated via a VPN tunnel through a firewall for management of access behind the firewall may be deemed to exceed the preset customer time limitation or access number limitation such that use of the hybrid configuration may be most optimal.

At block 704, in an embodiment, the hybrid endpoint integration process liaison system may parse the customized integration process developed pursuant to the user-generated visual flow diagram to associate portions of the integration process with plural runtime engines that may be located at distributed execution locations on-site behind firewalls, at public or private cloud locations or the like. For example, a first portion of the visual elements in the visual model of the customized integration process may be associated with a first runtime engine and a second portion of the visual elements in the visual model may be associated with a second runtime engine in an example embodiment where two execution may be utilized by the hybrid endpoint integration process liaison system. As described herein, when the data to be accessed lies behind a firewall, it may be advantageous in an embodiment to execute some of the code sets associated with an integration process behind the firewall. For example, code sets involving accessing data located behind a firewall may require repeated queries or fetches of data located behind the firewall. Execution of such code sets outside the firewall may require each query or fetch to occur over a VPN tunnel through the firewall if execution occurs outside the firewall with accesses of data behind a firewall. Communication via VPN may slow down each attempted access. In contrast, execution of such code sets from behind the firewall may be completed without the use of the VPN communication, and may prove more efficient than execution from outside the firewall. Thus, the hybrid endpoint integration process liaison system in an embodiment may associate various code sets in an integration process that involves accessing data located behind the firewall with a first runtime engine to be installed behind the firewall. Remaining code sets may be executed at a cloud location runtime engine outside of a firewall or may be designated for another location behind a firewall or at several cloud locations.

As also described herein, when the data to be accessed lies behind a firewall, it may be advantageous in an embodiment to execute some of the code sets associated with an integration process outside the firewall. For example, executing code sets involving manipulation of data may offload the computing overhead associated with execution of at least a portion of the integration process from the on-site customer's data center, and redistribute it to a cloud location. In such a way, the customer may free up more local computing resources for other tasks that are required to occur on-site. Thus, the hybrid endpoint integration process liaison system in an embodiment may associate each code set in an integration process that involves manipulating the accessed data with a second runtime engine installed outside the firewall, but which may access data behind one or more firewalls via the hybrid endpoint integration process liaison system.

It is understood that no order of parsing the customized integration process developed pursuant to the user-generated visual flow diagram is intended in designation of first, second, or other code set portions of the integration process to be distributed to first, second, or other runtime engine locations behind firewalls or other security barriers or at any cloud locations. Any number of runtime engine locations may be utilized in the hybrid execution location scheme determined by parsing the customized integration process via the embodiments described herein. The hybrid endpoint integration process liaison system may be used to parse and distribute code sets for execution to any number of locations in various embodiments. The presently-described embodiment illustrated in FIG. 7 describes a first and second execution location, with one behind a firewall and one in a cloud location, for simplicity of explanation. It is understood that the example of FIG. 7 is intended to be applied to plural locations of any combination behind firewalls or security barriers or not behind such barriers to seamlessly execute a customized integration process developed pursuant to user-generated visual flow diagram as described.

At block 706, in an embodiment, the hybrid endpoint integration process liaison system may generate the first and second runtime engines. In some embodiments, the first and second runtime engines may include instructions to automatically fetch the code sets associated with them upon installation of the engines, and to execute automatically. In other embodiments, one or more of the runtime engines may include instructions to poll the hybrid endpoint integration process liaison system to determine which code sets it should execute and when it should execute them. In an example embodiment, the hybrid endpoint integration process liaison system may manage the overall, distributed execution of the customized integration process developed via the visual model. In one example embodiment, the base portion of the customized integration process may be executed via code sets at a location outside a firewall such as at a base runtime engine location outside the firewall or may be orchestrated from the second runtime engine location. In other aspects, the second runtime location may be yet another execution location or locations outside the one or more behind-the-firewall runtime locations. It is understood that in yet other aspects, the base runtime engine location may be located behind a firewall and orchestrate to operate the customized integration process with runtime engines outside of the firewall in other example embodiments. In the presently-described embodiment of FIG. 7, the second runtime engine outside of a firewall may operate as a base runtime engine from which the hybrid endpoint integration process liaison system may manage a distributed execution of the customized integration process.

At block 708, in an embodiment, the first runtime engine may be installed behind the firewall at the on-site data center and the second runtime engine may be installed in a private or public cloud location. The first runtime engine may be transmitted to the on-site customer data center from the hybrid endpoint integration process liaison system in some embodiments. In other embodiments, the first runtime engine may be installed behind the firewall by an administrator having security credentials to access firewalled data.

At block 710, in an embodiment, the code sets associated with the second portion of visual elements in the visual flow chart of a customized integration process and associated code sets with each portion may be transmitted to the second runtime engine for execution of one or more parts of the overall integration process not requiring access to data behind the firewall. The hybrid endpoint integration process liaison system may manage having the second portion of the customized integration process operate on the second runtime engine location outside of the firewall in an embodiment. The second portion of the integration process may be the base execution flow for the overall customized integration process developed pursuant to a visual model by a user and may require portions for access to data behind a firewall such as with that executed by the first portion of the customized integration process in the present example embodiment. For example, the visual elements associated with manipulation of data accessed in an embodiment may be associated with the second runtime engine installed outside the firewall and may require portions of the overall integration process to occur inside of a firewall or other security barrier. In such embodiments, the hybrid endpoint integration process liaison system may identify the code sets associated with the data manipulation visual elements, and transmit those data manipulation related code sets to the second runtime engine for execution from the cloud-based location as some or all of the base integration process operation.

In other aspects, it may be appreciated that plural execution locations may be utilized outside any firewalls and a second or other runtime engine outside of a firewall may be designated for a portion of execution of the integration process. In such an embodiment, the hybrid endpoint integration process liaison system may manage distribution of code sets to additional runtime engine locations outside a firewall in manage coordination of the execution of those portions of the execution of the customized integration process via requests for execution and data from these locations in some embodiments since the security barriers are different. In other aspects, the polling system from other non-firewalled cloud locations may also be utilized in some embodiments.

At block 712, in an embodiment, the hybrid endpoint integration process liaison system may receive a polling query from the first runtime engine requesting any work needed done by the hybrid endpoint integration process liaison system managing the customized integration process distributed for execution at various locations. The first request for work may include a request for the code sets for execution at the location behind the firewall that emanates from inside the firewall which allows for distribution of the code sets through the firewall to the runtime engine within the firewall. If the hybrid endpoint integration process liaison system has already sent the code sets associated with the first runtime engine to the on-site firewalled data location, this block may not be necessary in some embodiments of the method. In other embodiments, the first runtime engine may poll the hybrid endpoint integration process liaison system to receive updated code sets in some embodiments if changes are detected.

At block 714, the hybrid endpoint integration process liaison system in an embodiment may respond to the polling query by identifying the code sets associated with the first runtime engine that should be run to access data, manipulate or process data, or retrieve data behind the firewall. This may be done when the base runtime engine operating the customized integration process code sets has reached a point needing the access to data or resources behind the firewall in some instances as determined by the hybrid endpoint integration process liaison system. For example, the visual elements associated with accessing of data behind a firewall in an embodiment may be associated with the first runtime engine installed behind the firewall. In such embodiments, the hybrid endpoint integration process liaison system may identify the code sets associated with the data access visual elements, and transmit the need to execute those code sets to the first runtime engine for execution from behind the firewall such as for supporting execution of the overall customized integration process. The first runtime engine may periodically poll the hybrid endpoint integration process liaison system for whether additional tasks are needed for completion by the runtime engine behind the firewall as the base runtime engine such as the second runtime engine proceeds with the overall execution of the customized integration process. For example, as the customized integration process proceeds, it may require portions of the integration process that have been distributed for execution behind the firewall at the first runtime engine to execute one or more of the code sets associated with the first runtime engine such as to access or retrieve data or process data behind the firewall. The hybrid endpoint integration process liaison system may also receive in the polling query of via another polling query from the first runtime engine requesting instructions as to when it should execute received code sets potentially at later points of the customized integration process. In other embodiments, the first runtime engine may execute pursuant to an explicit instruction from the customer, at a pre-specified time, or repeatedly according to a pre-specified schedule.

At block 716, in an embodiment, the hybrid endpoint integration process liaison system may have transmitted instructions to execute some or all of the first integration process distributed for execution by the first runtime engine. The first runtime engine may execute the first portion of the integration process in accordance with these instructions from the hybrid endpoint integration process liaison system. Upon execution of the identified codesets, the first runtime engine may subsequently respond from within the firewall with the requested data or other result from the code set execution located there. In this way, the security of the firewall or other security barrier remains intact since the operation of the first runtime engine inside the firewall is authorized.

The first runtime engine may then respond to the hybrid endpoint integration process liaison system with the requested results and continue to periodically poll if additional tasks are required for the overall customized integration process. In this way, the hybrid endpoint integration process liaison system may seamlessly operate behind the firewall of an on-site or other controlled cloud location in a distributed execution scheme along with operations outside of the firewalled or other location subject to security barriers. In some embodiments, execution of the first runtime engine at the on-site data center may occur completely autonomously and may store results for the customized integration process locally for transmission to the hybrid endpoint integration process liaison system. In yet other aspects, operation of the hybrid endpoint integration process liaison system may not require any action on the part of the customer or user, including determination of the optimal location for execution of the first runtime engine or other distributed runtime engines.

At block 718, in an embodiment, the hybrid endpoint integration process liaison system may transmit instructions to continue execution of the second integration process portion which in the described embodiment may be the base integration process flow of the customized integration process. The hybrid endpoint integration process liaison system may provide the data or results of the data accessed from behind the firewall via the first portion of the integration process to the second integration process portion for completion of the customized integration process established via the customized visual model developed by a user. It is appreciated that although FIG. 7 only discusses a first and second runtime engines inside and outside of a firewall protected location respectively for distributed execution of the overall customized integration process, plurality of locations both within firewall protected locations and cloud locations outside firewall or other security protections may be utilized by the hybrid endpoint integration process liaison system. In other words, plural "first" runtime engines or plural firewall protected runtime engine locations, may be utilized according to the embodiments herein each polling the hybrid endpoint integration process liaison system for execution instructions of parsed code sets associated with those locations. The plural firewall protected runtime engine locations may poll from within their respective firewalls according to embodiments herein to facilitate access to firewall protected data by the customized integration process when operating via a hybrid execution location scheme.

By the same token, plural "second" runtime engines or outside-firewall cloud runtime engine locations may be utilized by the hybrid endpoint integration process liaison system for a hybrid execution location scheme in other embodiments. For example, the hybrid endpoint integration process liaison system may transmit instruction to a second runtime engine located outside of the firewall that is different from the base runtime engine from which the customized integration process is operating. In such an embodiment, for example, plural runtime engine execution locations outside the firewall may be utilized by the hybrid endpoint integration process liaison system for distributed execution.

In further aspects of the embodiments, execution of the second runtime engine within the cloud via management of the distributed execution scheme by the hybrid endpoint integration process liaison system may occur completely autonomously. The hybrid endpoint integration process liaison system may require no action on the part of the customer, including determination of an optimal location for execution of the second runtime engine if applicable. In other embodiments, the second runtime engine may execute pursuant to an explicit instruction from the customer, at a pre-specified time, or repeatedly according to the same pre-specified schedule employed by the first runtime engine as described directly above. At this point the process may end when the customized integration process has completed.

The blocks of the flow diagrams 5-8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a hybrid endpoint integration process liaison system comprising:
    a memory storing code instructions of the hybrid endpoint integration process liaison system; and
    a processor operatively connected to the memory, the processor executing the code instructions to:
        determine an estimated volume of electronic data to be migrated via a Virtual Private Network (VPN) tunnel through a secure firewall pursuant to an integration process modeled by a plurality of visual modeling elements selected from a menu of visual modeling elements, each of the plurality of visual modeling elements being associated with one of a plurality of code sets, wherein the integration process is executable by a customized software integration application for transforming the electronic data to enable access and manipulation of the electronic data at an electronic data storage location located behind the secure firewall;
        estimate a time duration for migration of the estimated volume of the electronic data via the VPN tunnel based on the estimated volume of the electronic data to be migrated via the VPN tunnel;
        when the estimated time duration for migration of the estimated volume of the electronic data via the VPN tunnel exceeds a preset threshold time:
            determine an optimal configuration for execution of the plurality of code sets, wherein the optimal configuration includes an execution location behind the secure firewall for execution of one or more of the plurality of code sets by a first runtime engine; and transmit the first runtime engine to the execution location behind the secure firewall, wherein the first runtime engine is configured to access or manipulate at least a portion of the estimated volume of electronic data behind the secure firewall to reduce calls through the VPN tunnel and to reduce a time to execute the integration process.

2. The information handling system of claim 1, further comprising:
the processor executing the code instructions to:
receive a request from the first runtime engine for code sets for execution; and
transmit at least one of the plurality of code sets to the first runtime engine at the execution location behind the secure firewall in response to the request received from the first runtime engine.

3. The information handling system of claim 1, further comprising:
the processor executing the code instructions to:
receive electronic data migrated from behind the secure firewall from the first runtime engine pursuant to execution of a first subset of the plurality of code sets by the first runtime engine; and
transmit the received electronic data to a second runtime engine at an execution location outside of the secure firewall, wherein the second runtime engine is configured to execute a second subset of the plurality of code sets to manipulate the received datasets outside the secure firewall to decrease an amount of computing resources located behind the secure firewall that are required to execute the integration process.

4. The information handling system of claim 1, further comprising:
the processor executing the code instructions to:
determine the optimal configuration for execution of the plurality of code sets, wherein the optimal configuration includes an execution location outside the secure firewall for execution of one or more of the plurality of code sets by a second runtime engine; and
transmit the second runtime engine to the execution location outside the secure firewall, wherein the second runtime engine is configured to access or manipulate at least a portion of the estimated volume of electronic data outside the secure firewall to decrease an amount of utilized computing resources located behind the secure firewall that are required to execute the integration process.

5. The information handling system of claim 1, further comprising:
the processor executing the code instructions to:
estimate a temporary storage requirement for storage of electronic data to be accessed pursuant to the integration process; and
determine the optimal configuration further based on a weighted analysis of the estimated temporary storage requirement.

6. The information handling system of claim 1, further comprising:
the processor executing the code instructions to:
when the estimated time duration does not exceed a customer-specified pre-set time duration value for the preset threshold time;
determine the optimal configuration for execution of the plurality of code sets, wherein the optimal configuration includes an execution location outside the secure firewall for execution of each of the plurality of code sets by the first runtime engine; and
transmit the first runtime engine with each of the plurality of the code sets to the execution location outside the secure firewall.

7. The information handling system of claim 1, further comprising:
the processor executing the code instructions to:
receive a request from a second runtime engine for code sets for execution; and
transmit at least one of the plurality of code sets to the second runtime engine at an execution location outside the secure firewall in response to the request received from the second runtime engine, wherein the second runtime engine is configured to access or manipulate at least a portion of the estimated volume of electronic data outside the secure firewall to decrease an amount of computing resources located behind the secure firewall that are required to execute the integration process.

8. A method comprising:
determining an estimated volume of electronic data to be migrated via a Virtual Private Network (VPN) tunnel through a secure firewall pursuant to an integration process modeled by a plurality of visual modeling elements selected from a menu of visual modeling elements, each of the plurality of visual modeling elements being associated with one of a plurality of code sets, wherein the integration process is executable by a customized software integration application for transforming the electronic data to enable access and manipulation of the electronic data at an electronic data storage location located behind the secure firewall;
estimating a time duration for migration of the estimated volume of datasets via the VPN tunnel based on the estimated volume of datasets to be migrated via the VPN tunnel;
when the estimated time duration for migration of the estimated volume of the electronic data via the VPN tunnel exceeds a preset threshold time:
determining an optimal configuration for execution of the plurality of code sets, wherein the optimal configuration includes an execution location behind the secure firewall for execution of one or more of the plurality of code sets by a first runtime engine; and
transmitting at least one of the plurality of code sets and the first runtime engine to the execution location behind the secure firewall, wherein the first runtime engine is configured to access or manipulate at least a portion of the estimated volume of the electronic data behind the secure firewall to reduce calls through the VPN tunnel and to reduce a time to execute the integration process.

9. The method of claim 8, further comprising:
receiving a request from the first runtime engine for code sets for execution; and
transmitting at least one of the plurality of code sets to the first runtime engine at the execution location behind the secure firewall in response to the request received from the first runtime engine.

10. The method of claim 8, further comprising:
receiving electronic data migrated from behind the secure firewall from the first runtime engine pursuant to execution a first subset of the plurality of code sets by the first runtime engine; and transmitting the received electronic data to a second runtime engine at an execution location outside of the secure firewall, wherein the second runtime engine is configured to execute a second subset of the plurality of code sets to manipulate the received electronic data outside the secure firewall to decrease an amount of computing resources located behind the secure firewall that are required to execute the integration process.

11. The method of claim 8, further comprising:
determining the optimal configuration for execution of the plurality of code sets, wherein the optimal configuration includes an execution location outside the secure firewall for execution of one or more of the plurality of code sets by a second runtime engine; and
transmitting the second runtime engine to the execution location outside the secure firewall, wherein the second runtime engine is configured to access or manipulate at least a portion of the estimated volume of electronic data outside the secure firewall to decrease an amount of computing resources located behind the secure firewall that are required to execute the integration process.

12. The method of claim 8, further comprising:
estimating a temporary storage requirement for storage of electronic data to be accessed at the electronic data storage location pursuant to the integration process; and
determining the optimal configuration further based on a weighted analysis of the estimated temporary storage requirement.

13. The method of claim 8, further comprising:
receiving a request from a second runtime engine for code sets for execution; and
transmitting at least one of the plurality of code sets to the second runtime engine at an execution location outside the secure firewall in response to the request received from the second runtime engine, wherein the second runtime engine is configured to access or manipulate at least a portion of the estimated volume of electronic data outside the secure firewall to decrease an amount of computing resources located behind the secure firewall that are required to execute the integration process.

14. The method of claim 8, further comprising:
transmitting to a second runtime engine at a second execution location outside the secure firewall a second of the plurality of code sets, and an identification of datasets accessed or manipulated behind the secure firewall pursuant to execution of the first runtime engine.

15. An information handling system operating a hybrid endpoint integration process liaison system comprising:
a memory storing code instructions of the hybrid endpoint integration process liaison system; and
a processor operatively connected to the memory, the processor executing the code instructions to:
determine an estimated volume of electronic data to be migrated via a Virtual Private Network (VPN) tunnel through a secure firewall pursuant to an integration process modeled by a plurality of visual modeling elements selected from a menu of visual modeling elements, each of the plurality of visual modeling elements being associated with one of a plurality of code sets, wherein the integration process is executable by a customized software integration application for transforming the electronic data to enable access and manipulation of the electronic data at an electronic data storage location;
estimate a time duration for migration of the estimated volume of the electronic data via the VPN tunnel that is based on the estimated volume of electronic data to be migrated via the VPN tunnel;
estimate a temporary storage requirement for storage of electronic data to be accessed pursuant to the integration process, wherein the estimated temporary storage requirement is based on the estimated volume of the electronic data to be migrated via the VPN tunnel through the secure firewall;
when the estimated time duration for migration of the estimated volume of the electronic data via the VPN tunnel exceeds a preset threshold time and the estimated temporary storage requirement falls below a customer specified preset available storage capacity of the electronic data storage location:
determine an optimal configuration for execution of the plurality of code sets, wherein the optimal configuration includes an execution location behind the secure firewall for execution of one or more of the plurality of code sets by a first runtime engine; and
transmit the first runtime engine to the execution location behind the secure firewall, wherein the first runtime engine is configured to access or manipulate at least a portion of the estimated volume of the electronic data behind the secure firewall to reduce calls through the VPN and to reduce a time to execute the integration process.

16. The information handling system of claim 15 further comprising:
the processor executing the code instructions to:
receive a request from the first runtime engine for code sets for execution; and
transmit at least one of the plurality of code sets to the first runtime engine at the execution location behind the secure firewall in response to the request received from the first runtime engine.

17. The information handling system of claim 16, further comprising:
the processor executing the code instructions to:
receive electronic data migrated from behind the secure firewall from the first runtime engine pursuant to execution of a first subset of the plurality of code sets by the first runtime engine; and
transmit the received electronic data to a second runtime engine at an execution location outside of the secure firewall, wherein the second runtime engine is configured to execute a second subset of the plurality of code sets to manipulate the received datasets outside the secure firewall to decrease an amount of computing resources located behind the secure firewall that are required to execute the integration process.

18. The information handling system of claim 15, further comprising:
the processor executing the code instructions to:
determine the optimal configuration further based on a weighted analysis of the estimated temporary storage requirement.

19. The information handling of claim 15, further comprising:
the processor executing the code instructions to:
determine the optimal configuration for execution of the plurality of code sets, wherein the optimal configuration includes an execution location outside the secure firewall for execution of one or more of the plurality of code sets by a second runtime engine; and transmit the second runtime engine to the execution location outside the secure firewall, wherein the second runtime engine is configured to access or manipulate at least a portion of the estimated volume of the electronic data outside the secure firewall to decrease an amount of computing resources located behind the secure firewall that are required to execute the integration process.

20. The information handling system of claim 15 further comprising:

the processor executing the code instructions to:
receive a request from a second runtime engine for code sets for execution; and
transmit at least one of the plurality of code sets to the second runtime engine at an execution location outside the secure firewall in response to the request received from the second runtime engine, wherein the second runtime engine is configured to access or manipulate at least a portion of the estimated volume of electronic data outside the secure firewall to decrease an amount of computing resources located behind the secure firewall that are required to execute the integration process.

\* \* \* \* \*